United States Patent
Fussey et al.

[11] Patent Number: 6,123,375
[45] Date of Patent: Sep. 26, 2000

[54] PARTS GRIPPER

[75] Inventors: David A. Fussey, Fort Wayne; Patrick A. Abbott, Decatur; Nelson A. Broman, Bluffton; Matthew R. Pranger, New Haven, all of Ind.

[73] Assignee: PHD, Inc., Fort Wayne, Ind.

[21] Appl. No.: 09/255,224

[22] Filed: Feb. 22, 1999

Related U.S. Application Data

[60] Provisional application No. 60/075,480, Feb. 23, 1998, and provisional application No. 60/099,395, Sep. 8, 1998.

[51] Int. Cl.⁷ ..................................................... B25J 15/08
[52] U.S. Cl. ............................ 294/88; 294/119.1; 901/37
[58] Field of Search ................................... 294/88, 119.1, 294/907; 269/32, 34, 233, 234; 279/110, 121; 414/729, 730, 741, 751; 901/32–39, 46

[56] References Cited

U.S. PATENT DOCUMENTS

| | | | |
|---|---|---|---|
| 4,593,948 | 6/1986 | Borcea et al. | 294/119.1 X |
| 4,607,873 | 8/1986 | Nusbaumer et al. | 294/119.1 X |
| 4,693,505 | 9/1987 | Dimeo . | |
| 4,735,452 | 4/1988 | Nemoto | 294/119.1 |
| 4,762,357 | 8/1988 | Bergamo | 294/119.1 |
| 4,768,821 | 9/1988 | Hurcul . | |
| 4,808,898 | 2/1989 | Pearson . | |
| 4,819,978 | 4/1989 | Scheinman et al. . | |
| 4,892,344 | 1/1990 | Takada et al. | 294/119.1 X |
| 4,913,481 | 4/1990 | Chin et al. | 294/119.1 X |
| 4,976,484 | 12/1990 | Nomaru et al. . | |
| 5,184,861 | 2/1993 | Voellmer . | |
| 5,671,962 | 9/1997 | Otsuka et al. . | |

FOREIGN PATENT DOCUMENTS

| | | |
|---|---|---|
| 54-22659 | 2/1979 | Japan . |
| 1175-691 | 5/1985 | U.S.S.R. . |

*Primary Examiner*—Johnny D. Cherry
*Attorney, Agent, or Firm*—Barnes & Thornburg

[57] ABSTRACT

A parts gripper apparatus having an actuator, a driver cooperatively engaged with the actuator such that the driver is caused to rotate by rotary movement created by the actuator, and a pair of opposed jaw members either disposed through the driver and movable to open and closed positions in a reciprocating linear motion along the driver or coupled to the driver and movable to open and closed positions as the driver moves in a reciprocating motion.

20 Claims, 5 Drawing Sheets

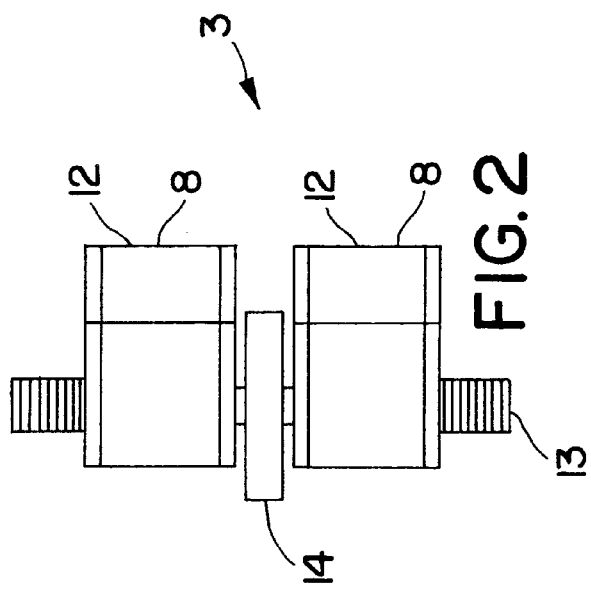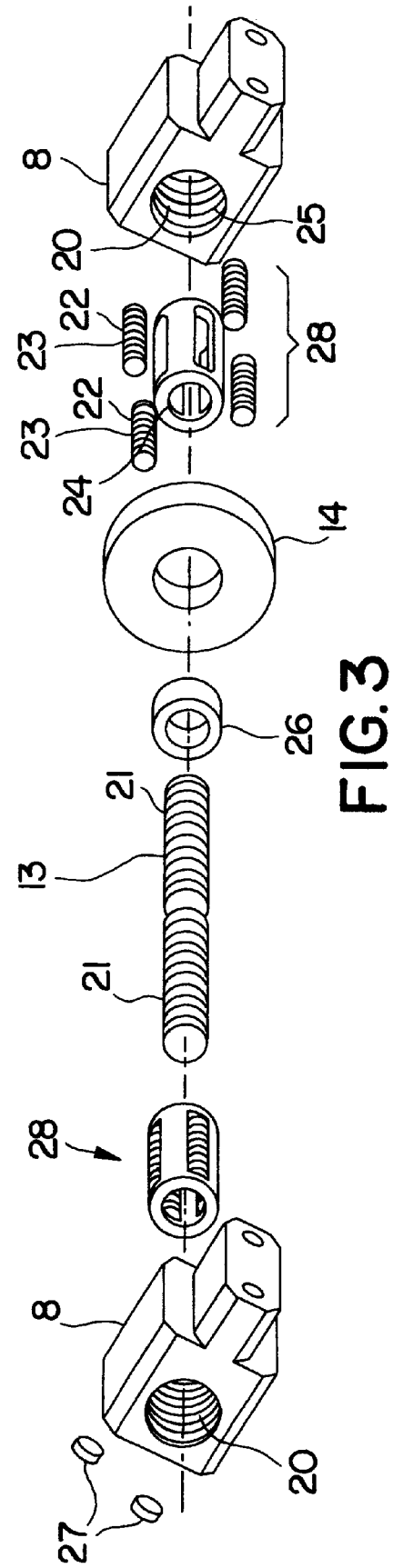

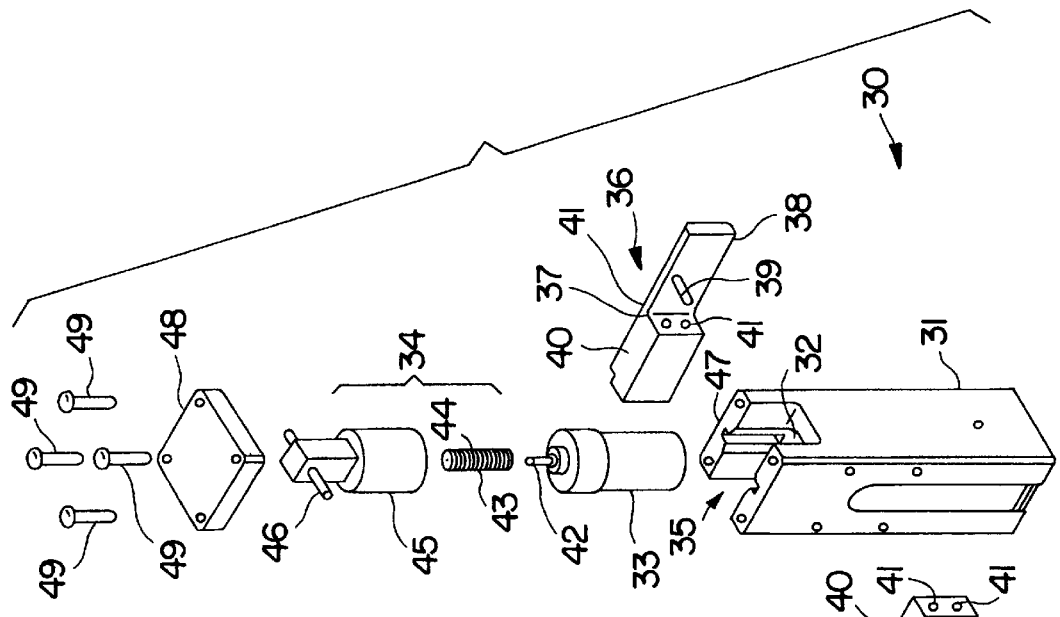
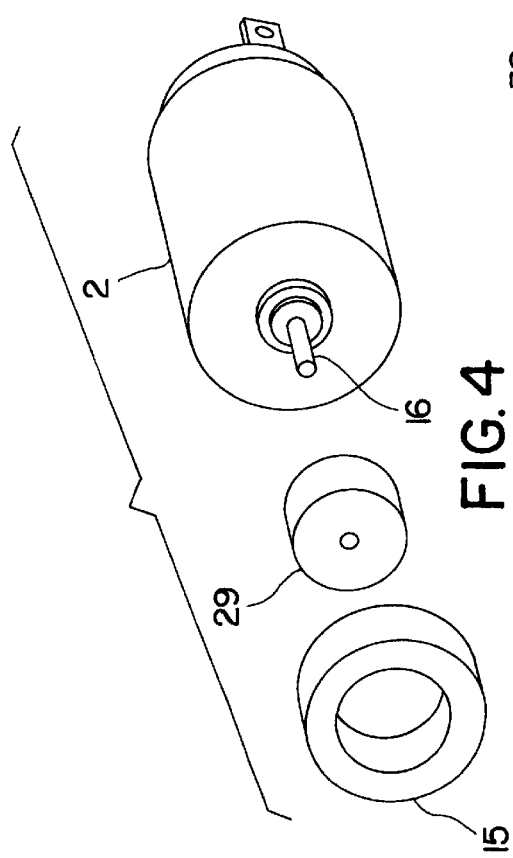

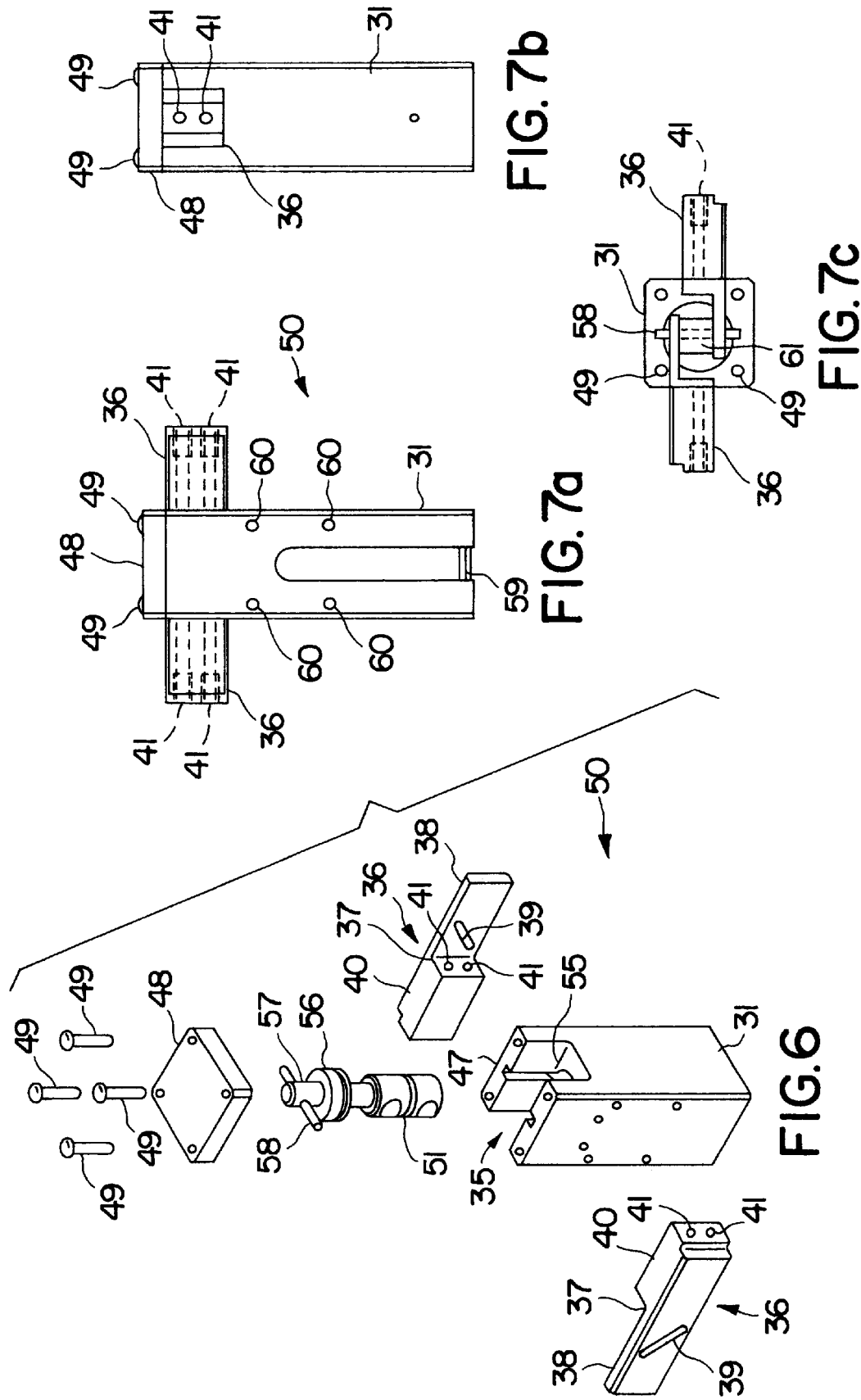

PARTS GRIPPER

RELATED APPLICATIONS

The present application is based upon U.S. Provisional application Ser, No. 60/075,480, filed on Feb. 23, 1998, and U.S. Provisional application Ser. No. 60/099,395, filed on Sep. 8, 1998, the complete disclosures of which are hereby expressly incorporated by reference.

TECHNICAL FIELD

The present invention relates to automated part transfer devices, including parts grippers. More particularly, the present invention relates to parts grippers that are designed to grip and transport small articles in potentially harsh environments.

BACKGROUND ART

There are a number of systems which require the transportation of small articles that are suitable for automation. For example, the transportation of samples and sample holders in automated clinical analyzers requires repetitive movement of samples through various stations including for example, reagent dispensing, mixing, incubation, monitoring, and disposal stations. In such systems, the sample holders can comprise test tubes, cuvettes, test slides, etc., which require transportation. In order to automate the transportation of such sample holders, highly accurate, light weight grippers are required.

To date, pneumatic grippers have been proposed for use in clinical analyzers and similar systems. However, the use of pneumatic grippers in such systems involves a number of disadvantages. For instance, the use of pneumatic grippers requires a controlled source of pressurized fluid which might add to the cost and complexity of the overall system. The pneumatic system for pneumatic grippers may also leak over time. If pneumatic system leaks develop in the vicinity of the gripper jaws, there is the possibility of dispersing hazardous material from a sample holder. A pneumatic system, however, can be used in the present invention for non-hazardous applications.

Small parts grippers are also applicable for use in semiconductor, hard drive, and other small part processing operations. Some of these processes involve environments which are hostile to various materials and moving parts, and therefore pose particular problems for parts grippers. For example, polishing processes for semiconductors and hard drives often utilize deionized water and polishing compound slurries, thus providing an environment which is particularly hostile to metal bodied parts grippers.

SUMMARY OF THE INVENTION

According to other features, characteristics, embodiments and alternatives of the present invention which will become apparent as the description thereof proceeds below, the present invention provides a gripper apparatus having an actuator, a driver cooperatively engaged with the actuator such that the driver is caused to rotate by rotary movement created by the actuator, and a pair of opposed jaw members linearly aligned, coupled to the driver and movable in a reciprocating linear movement along the driver. The opposed jaw members can be made from any suitable material including the plastic materials polyamide, acetal resins, semi-crystalline thermoplastic polyesters, and polyethylene-terephthalate and any combinations thereof. The driver can be made from any suitable material including hardened aluminum and stainless steel.

Another embodiment of the gripper apparatus comprises an actuator and a driver that are rotatably attached to the actuator. The gripper also has a jaw coupler having a bore extended therein and a pin attached thereto, such that the driver cooperates with the bore of the jaw coupler causing same to effect a reciprocal linear movement. A pair of jaw members each has a through-slot wherein the pin of the jaw coupler engages and moves along the through-slot of each jaw member. The pair of jaws move between their open and closed positions as the pin moves in a reciprocal manner by the actuator.

A further embodiment of the invention includes a gripper apparatus comprising a housing having a central bore disposed therethrough, a yoke on one end thereof, and pin receiving slots provided on facing surfaces of the yoke. An actuator is positioned inside the central bore of the housing and has a drive shaft rotatably attached thereto with a driver attached to the drive shaft. A jaw coupler cooperates with the driver to effect the reciprocal linear movement of the jaw coupler and the jaw members, each having a stepped structure defined between a narrow-width portion and a thicker portion, and which are aligned to abut each other. This embodiment can also include either an electrical or a pneumatic actuator positioned inside the central bore of the housing.

A still further embodiment of the gripper apparatus comprises an actuator and a drive nut having a bore disposed therethrough. A drive assembly comprises a driver and a pin attached to the driver, wherein the driver is rotatably disposed through the bore of the drive nut and is attached to the actuator. A pair of jaw members engages the pin from the driver causing the jaw members to move between their open and closed positions as the driver moves in a linearly reciprocal manner.

Another embodiment of the gripper apparatus comprises an actuator and a drive nut having a bore disposed therethrough and a pair of resilient thrust bearings each attached to opposite ends of the drive nut. A drive assembly comprising a driver and a pin attaches to the driver. The driver corresponds to the drive nut which is attached to the actuator that rotatably engages the drive nut causing the driver to move in a linearly reciprocating manner. The jaw members, similar in structure to prior embodiments, move between open and closed positions as the pin moves in a reciprocal manner by the actuator and along the axis of rotation of the actuator.

Additional features of the invention will become apparent to those skilled in the art upon consideration of the following detailed description of a preferred embodiment exemplifying the best mode of carrying out the invention as presently perceived.

BRIEF DESCRIPTION OF DRAWINGS

The present invention will be described hereafter with reference to the attached drawings which are given as non-limiting examples only, in which:

FIG. 2 is a side view of the jaw drive assembly of FIG. 1.

FIG. 3 is an exploded perspective view of the jaw drive assembly of FIG. 1.

FIG. 4 is an exploded perspective view of the actuator of FIG. 1.

FIG. 5 is an exploded perspective view of a parts gripper according to another embodiment of the present invention.

FIG. 6 is an exploded isometric view of a parts gripper according to another embodiment of the present invention.

FIG. 7a is a front view of the parts gripper of FIG. 6.

FIG. 7b is a side view of the parts gripper of FIG. 6.

FIG. 7c is an end view of the parts gripper of FIG. 6.

DISCLOSURE OF THE INVENTION

Figure 1:
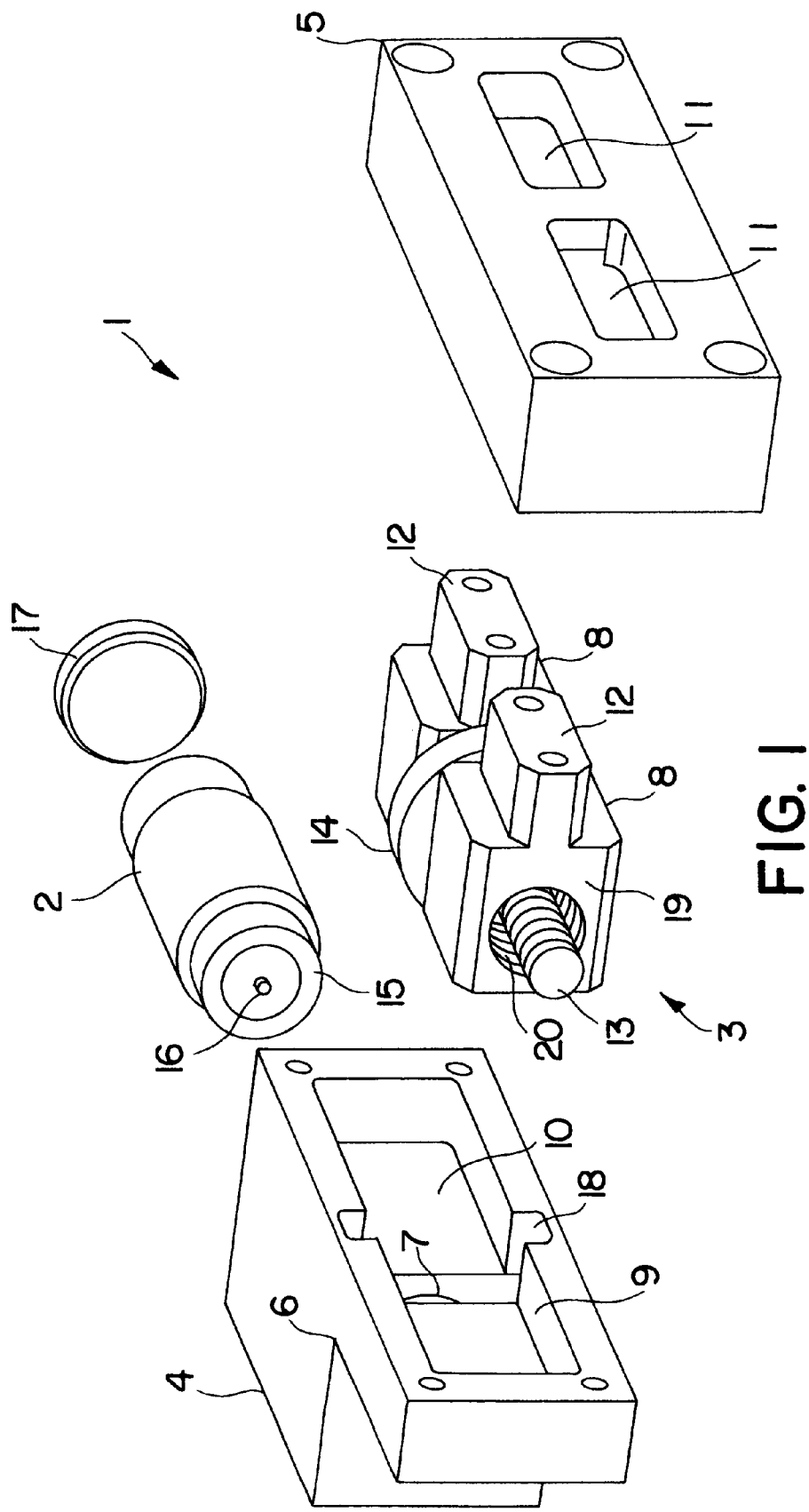
FIG. 1 is an exploded isometric view of a parts gripper according to one embodiment of the present invention.

The present invention is directed to parts grippers that are compact, light weight and capable of generating large gripping forces (relative to the size and weight of the grippers) in a controlled manner. FIG. 1 is an exploded isometric view of a parts gripper 1 according to one embodiment of the present invention. Parts gripper 1 includes an actuator 2, a jaw drive assembly 3, and a housing defined by a housing base 4 and a housing top 5 coupled together by mechanical fasteners (e.g. screws, bolts, etc., chemical means, e.g. cements, epoxies, etc., or by other suitable means, not shown). Actuator 2 is received in housing base 4. The housing includes a stepped base portion 6 having an innermost chamber 7 which receives actuator 2. Jaw drive assembly 3 to which the jaw members 8 are coupled is received in an outermost chamber 9 in housing base 4. Innermost chamber 7 and outermost chamber 9 are separated by a wall 10 which helps maintain alignment of jaw members 8. Housing top 5 includes through-slots 11 through which jaw members 8 extend when housing base 4 and housing top 5 are coupled together. Through-slots 11 are elongated so as to allow the ends 12 of jaw members 8 to move therein.

Jaw drive assembly 3 includes a driver 13 which extends through each of jaw members 8. Jaw drive gear 14 (teeth not shown) is used to rotate driver 13 causing each jaw member 8 to travel in opposite directions. Actuator 2, which can be an electrical motor, includes an actuator drive gear 15 (teeth not shown) which cooperates with jaw drive gear 14 to transfer rotational motion from actuator drive shaft 16, to driver 13. FIG. 1, also shows a housing plug 17 used to seal a corresponding opening in the side of housing base 4 (not shown), providing access to innermost chamber 7. Removal of housing plug 17 allows actuator 2 to be installed or removed from housing base 4. It is understood that in order to keep the overall gripper compact, housing base 4 includes a notched portion 18 for receiving jaw drive gear 14.

Housing base 4, housing top 5, housing plug 17, driver 13, jaw drive gear 14, and jaw members 8 are preferably made from plastic materials such as polyamide, acetal resins, semi-crystalline thermoplastic polyesters, e.g. polyethylene-terephthalate, which may or may not be cryogenically treated to improve hardness and service life. Driver 13 can be made of hardened aluminum, stainless steel, or other suitable metal.

Jaw members 8 have body portions 19 with threaded bores 20 disposed therethrough. Driver 13 extends through threaded bores 20 as discussed below.

FIG. 2 is a side view of jaw drive assembly 3. FIG. 2 depicts one manner in which jaw members 8 and jaw drive gear 14 align along driver 13.

FIG. 3 is an exploded perspective view of the jaw drive assembly 3 of FIG. 1. Jaw driver 13 includes opposed spiral grooves 21 (or threads) which extend outward from the center thereof. These grooves cooperate with corresponding grooves 22 (or threads) on rollers 23 which are contained in roller cage 24 forming a roller assembly 28. Grooves 22 on rollers 23 in turn cooperate with internal threads 25 in threaded bores 20 of jaw members 8. In operation, when driver 13 is rotated in one direction, grooved engagement between driver 13, rollers 23 and threaded bores 20 causes jaw members 8 to move in opposite directions. When driver 13 is rotated in a reverse direction, the grooved engagement between driver 13, rollers 23 and threaded bores 20 causes jaw members 8 to move in a reciprocally opposite direction.

Jaw drive gear 14 is coupled to driver 13 by a sleeve 26. Jaw drive gear 14, sleeve 26 and driver 13 can be coupled together by cement, epoxy or glue, e.g. Loctite®. One or both jaw members 8 can be provided with detectable targets 27 such as magnets or metal elements. Metal targets, which can be used in conjunction with inductive proximity, can be attached or imbedded in the gripper jaw members or, since movement of any of the components of the drive assembly is proportional to jaw movement, the metal targets could be attached to or embedded in any convenient position on one of the components of jaw drive assembly 3. In addition to metal targets which are used in conjunction with inductive proximity sensors, magnetic targets could be used in the present invention in combination with Hall effect devices, magnetic reed switches, magneto resistance switches, and similar devices (not shown). Such magnetic targets could be attached to or embedded in the jaws or of the components of the jaw drive assembly 3.

FIG. 4 is an exploded perspective view of actuator 2, In a preferred embodiment actuator 2 includes an electric motor. Drive shaft 16 of actuator 2 is coupled to actuator drive gear 15 by a sleeve 29. Actuator drive gear 15, sleeve 29 and drive shaft 16 can be coupled together by a cement, epoxy or glue, e.g. Loctite®.

FIG. 5 is an exploded perspective view of parts gripper 30 according to a second embodiment of the present invention. This embodiment includes a housing 31 which includes a central bore 32 which receives an actuator 33 and jaw drive assembly 34. The front end of housing 31 includes a yoke structure 35, which receives jaw members 36. Jaw members 36 are generally rectangular and include a stepped structure 37 which provides each jaw member 36 with a narrow width portion 38. When jaw members 36 are assembled in housing 31, corresponding narrow width portions 38 of jaw members 36 are directed in opposite directions so that stepped structures 37 are aligned to abut one another. Narrow width portions 38 of jaw members 36 include angled through-slots 39 which are discussed in more detail below. The thicker portions 40 of jaw members 36 can include through-bores 41 through which mechanical fasteners, e.g. bolts, can be received to secure jaw tips or fingers to jaw members 36.

Actuator 33 in the embodiment of the parts gripper depicted in FIG. 5 comprises an electric motor. According to one embodiment, a 24 volt DC motor was found to be suitable for purposes of the present invention.

A drive shaft 42 of actuator 33 is coupled to a driver 43 so that driver 43 rotates together with drive shaft 42. Driver 43 includes one or more spherical grooves 44 (projections/threads) on its outer surface. Grooves 44 cooperate with corresponding structures on the inner surface of a bore (not shown) which extends into the base of jaw coupler 45. When driver 43 is rotated in one direction by actuator 33, jaw coupler 45 moves toward the actuator 33. When the driver 43 is rotated in an opposite direction by actuator 33, jaw coupler 45 moves away from the actuator 33. In a sense, the driver 43 and jaw coupler 45 effect a reciprocal linear movement as actuator 33 is rotated in different directions, similar to that of a piston.

The jaw coupler 45 includes a pin 46 which engages and moves along slots 39 formed in each of jaw members 36.

Slots 39 are configured, e.g. slanted, so that jaw members 36 move between their open and closed positions as pin 46 moves in a reciprocal manner by actuator 33 and along slots 39.

Housing 31 includes pin receiving slots 47 that are provided on facing surfaces of the yoke structure 35. Pin receiving slots 47 guide the reciprocal movement of pin 46 as it is driven reciprocally by the actuator 33.

An end plate 48 is used to secure jaw members 36, actuator 33 and drive assembly 34 in housing 31. End plate 48 can be secured to housing 31 by suitable mechanical fasteners such as screws 49 that are depicted in FIG. 5.

The actuator 33 depicted in FIG. 5 can be coupled to a magnetic or inductive encoder 148 (illustratively shown in FIG. 8) and used in conjunction with proximity sensors and an electronic motion controller (not shown). Such magnetic encoders 148 are known and are commercially available from a number of manufacturers. A conventional electronic motion controller can be used in conjunction with the grippers of the present invention and can be configured as desired to monitor and control the direction of rotation, the speed of rotation and the number of rotational revolutions of the drive shaft 42 of the motor 33. In operation, the encoders 148 produces a number of pulses as the drive shaft 42 of the motor 33 rotates. These pulses can be fed to an electronic motion controller and used in a known manner to monitor and control such parameters as the direction of rotation, the speed of rotation and the number of rotational revolutions of the drive shaft 42 of the motor 33. These parameters in turn can be used to control the speed at which gripper jaws 36 open and close, the position at which gripper jaws 36 stop when open or closed, and the amount of force applied to an object gripped by gripper jaws 36. Such control can allow the parts grippers of the present invention to function as measuring tools. That is, by counting the number of pulses produced by encoder 148, as gripper jaws 36 close on an object, the distance between gripper jaws 36 can be determined. This distance is a measurement of the object being gripped.

According to one embodiment of the present invention, at least one of the jaw members 36 can be provided with detectable targets 27 (see FIG. 3) such as magnets or metal elements which can be detected by induction. In this embodiment, the position, or reference position, of jaw members 36 can be sensed and this sensed portion is used in conjunction with a magnetic encoder 148 and motor controller to control the operation of the parts gripper.

FIG. 6 is an exploded isometric view of parts gripper 50 according to the third embodiment of the present invention. In this embodiment, housing 31, jaw members 36 and end plate 48 are substantially similar to the same corresponding parts depicted in FIG. 5. A pneumatic actuator 51 comprises a bore 55 which is formed in the housing 31 and a pneumatic piston 56 which is received in bore 55 and is reciprocally moveable therein by the application of fluid pressure in a known manner. Pneumatic piston 56 includes a piston rod 57 through which a pin 58 extends as depicted. This pin 58 is received in slots 39 of jaw members 36. Movement of pneumatic piston 56 upward in FIG. 6 would cause jaw members 36 to move outward to their open position as pin 58 moves through or along slots 39. Movement of pneumatic piston 56 downward in FIG. 6 would cause jaw members 36 to move inward to their closed position.

FIG. 7a is a front view of parts gripper 50. Jaw members 36 are depicted in their open position in FIG. 7a (and FIG. 7c). A slot 59 for an electrical ribbon is provided at the base of the housing. In the case of a housing for a pneumatic gripper, one or more fluid ports are included in place of slot 59. Such fluid ports can be positioned at any convenient location whereat they can apply fluid pressure/vacuum to drive a pneumatic piston. End plate 48 is depicted as being attached to the end of the housing 31. Jaw members 36 in FIG. 7a (and FIG. 7c) have through-bores 41 represented by the broken lines. These through-bores 41 can be used to attach jaw tips or fingers to jaw members 36. Bores 60 depicted in FIG. 7a can be used to attach or couple parts gripper 50 to a suitable support structure for use. In order to provide structural support to housing 31, it may comprise a composite structure which includes reinforcing means such as metal plates or framework. Such a reinforcing plate can be included beneath the surface of the housing 31 which is provided with bores 60. Alternatively, anchored attachment structures such as threaded studs can be formed in the body of housing 31.

FIG. 7b is a side view of parts gripper 50. FIG. 7c is an end view of parts gripper 50. In FIG. 7c, end plate 48 is removed in order to depict jaw coupler 61, pin 58 and the structure of jaw members 36, which would otherwise be concealed by end plate 48.

As in the case of the embodiment of the parts gripper depicted in FIGS. 1–4, the other embodiments of the parts gripper depicted in FIGS. 5–7 can include components which are made from plastic materials such as polyamide, acetal resins, semi-crystalline thermoplastic polyesters, e.g. polyethylene-terephthalate, which may or may not be cryogenically treated to improve hardness and service life. Driver 43 depicted in FIG. 5 can be made of hardened aluminum, stainless steel, or other suitable metal. Likewise metal parts can be used in place of plastic parts.

Figure 8:
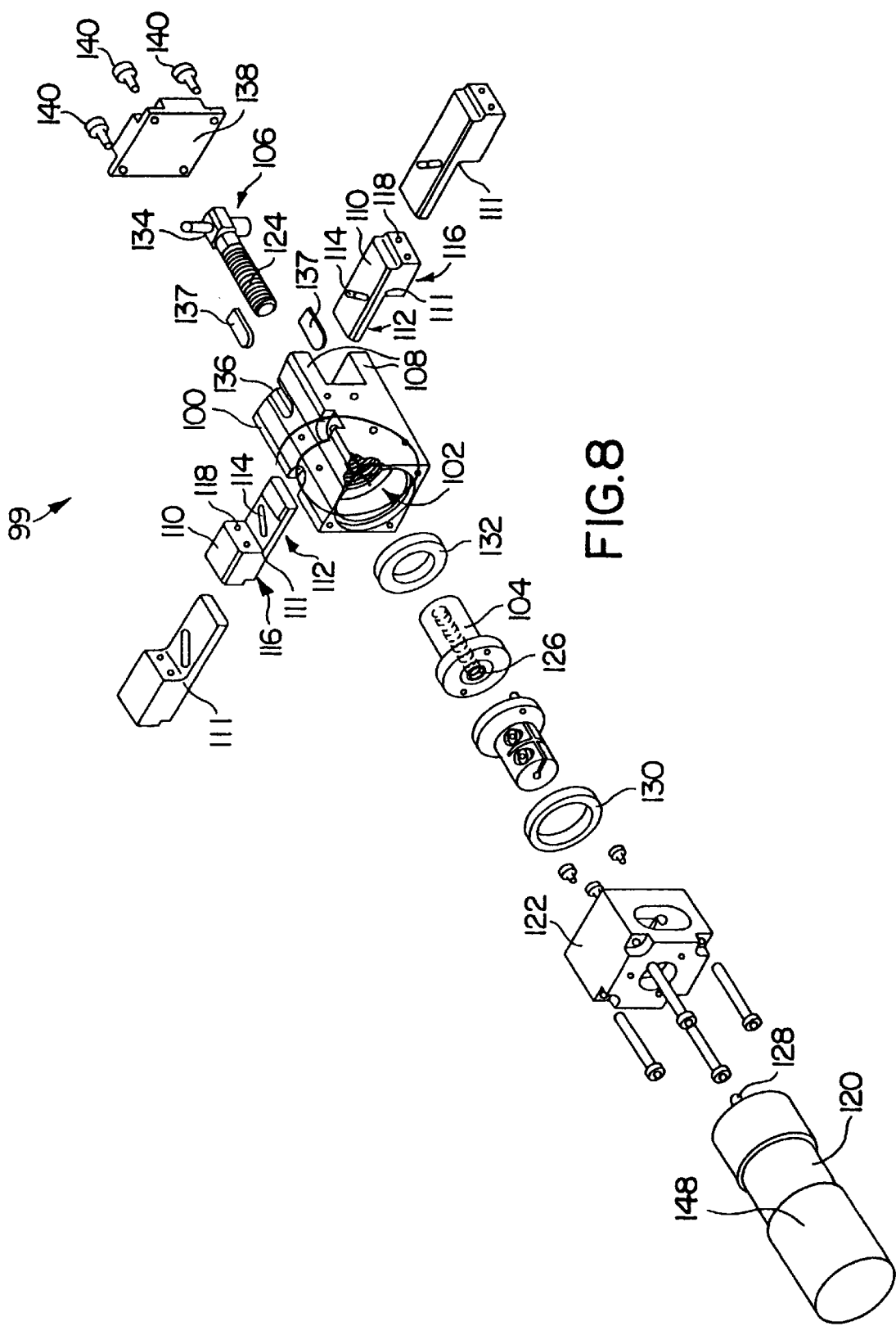
FIG. 8 is an exploded isometric view of a parts gripper according to another embodiment of the present invention.

FIG. 8 is an exploded perspective view of parts gripper 99 according to a fourth embodiment of the present invention. Parts gripper 99 includes a housing 100 having a central bore 102, which receives drive nut 104 and jaw drive assembly 106. One end of housing 100 includes a yoke structure 108, which receives jaw members 110. Jaw members 110 are generally rectangular and include a stepped structure 111 which provides each jaw member 110 with a portion 112 having a narrow width. As indicated in FIG. 8, when jaw members 110 are assembled in housing 100, the corresponding narrow width portions 112 of jaw members 110 face in opposite directions so that stepped structures 111 are aligned to abut one another. The narrow width portions 112 of jaw members 110 include angled through-slots 114, which are discussed in more detail below. The thicker portions 116 of jaw members 110 can include through-bores 118, through which mechanical fasteners, such as bolts, can be received to secure jaw tips or fingers to jaw members 110.

Actuator 120 in the embodiment of parts gripper 99 depicted in FIG. 8 comprises an electric motor and planetary gearbox mounted to a motor mounting plate 122. According to one embodiment, a 24 volt DC motor together with a 19:1 gearbox ratio was found to be suitable for purposes of the present invention. The jaw driver assembly 106 is made from heat-treated stainless steel and is coated with PTFE to improve product life and to reduce friction. An outer surface 124 of driver 106 is provided with one or more spherical grooves, projections or threads. These grooves or projections co-operate with corresponding structures (e.g., projections or threads) on an inner surface of a bore 126 in drive nut 104 which, in this embodiment, is made from a low friction plastic compound. When actuator drive shaft 128 is rotated in one direction by actuator 120 and axially constrained by resilient thrust bearings 130 and 132, jaw driver assembly 106 moves toward actuator 120. When actuator drive shaft 128 is rotated in the opposite direction by actuator 120 and drive nut 104 is constrained by resilient thrust bearings 130 and 132, jaw driver assembly 106 moves away from actuator 120. In a sense, jaw driver assembly 106 effects a reciprocal linear movement (when actuator 120 is rotated in different directions) similar to that of a piston. The purpose of the resilient thrust bearings 130 and 132 is to reduce the shock load produced at jaw members 110 and thus prevent a grip force reversal that may result in a picked part being dropped.

Jaw driver assembly 106 includes a driver 134 and engages and moves along slots 114 formed in each of jaw members 110. These slots are slanted so that jaw members 110 move between their open and closed positions as driver 134 is moved in a reciprocal manner by actuator 120 and along slots 114.

According to the embodiment of the parts gripper depicted in FIG. 8, housing 100 includes driver receiving slots 136 that are provided on facing surfaces of the yoke structure 108. Driver receiving slots 136 guide the reciprocal movement of driver 134 as it is driven by actuator 120 and jaw driver assembly 106. Covers 137 are provided to shield the lateral ends of driver 134.

An end plate 138 is used to secure jaw members 110 and jaw drive assembly 106 in housing 100. End plate 138 can be secured to housing 100 by suitable mechanical fasteners, such as screws 140 that are depicted on FIG. 8.

Like the aforementioned grippers, parts gripper 99 of the present invention can be coupled to magnetic or proximity sensors and an electric motion controller. A conventional electronic motion controller can be used in conjunction with the grippers of the present invention and can be configured as desired to monitor and control the direction of rotation, the speed of rotation and the number of rotational revolutions of drive shaft 128 of actuator 120. This, in turn, can be used to control the speed at which the gripper jaws open and close and the amount of force applied to an object gripped by the gripper jaws.

According to one embodiment of the invention, at least one jaw driver leg can be provided with detectable targets such as magnets or metal elements which can be detected by induction. In this embodiment, the position, or reference position, of jaw members 110 can be sensed and this sensed portion used in conjunction with a motor controller to control the operation of the parts gripper.

As is the case of the embodiments of the parts grippers depicted in FIGS. 1–7, the parts gripper of FIG. 8 can include components which are metallic or plastic. Driver 134 depicted in FIG. 8 can be made of heat treated stainless or alloy steels or other suitable metal.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the following claims.

What is claimed:

1. A gripper apparatus comprising:
    a housing having a central bore disposed therethrough, a yoke on one end thereof, and pin guides provided on facing surfaces of the yoke;
    an actuator, positioned inside the central bore of the housing, the actuator having a drive shaft rotatably attached thereto;
    a threaded driver attached to the drive shaft;
    a jaw coupler having a threaded bore extending therein, wherein the threaded driver cooperates with the threaded bore of the jaw coupler to effect reciprocal linear movement of the jaw coupler, the jaw coupler also having a pin attached thereto, and wherein the jaw coupler is received inside the yoke such that the pin is received in the pin guides which guides reciprocal movement of the pin when the jaw coupler is driven reciprocally by the actuator; and
    a pair of jaws, each having a stepped structure defined between a narrow-width portion and a thicker portion, the stepped structures being aligned to abut each other, the narrow-width portion of each of said jaws also having a through-slot disposed therethrough wherein the pin engages each of said jaws and moves along each through-slot such that the pair of jaws move between an open and closed position as the pin moves in a reciprocal manner by the actuator and within the through-slots.

2. The gripper apparatus according to claim 1, wherein the pair of jaws are made from a plastic material.

3. The gripper apparatus according to claim 2, wherein the pair of jaws are made from a material selected from the group consisting of polyamide, acetal resins, semi-crystalline thermoplastic polyesters, and polyethyleneterephthalate and combinations thereof.

4. The gripper apparatus according to claim 1, wherein the threaded driver is made from a metal.

5. The gripper apparatus according to claim 4, wherein the threaded driver is made from a material selected from the group consisting of hardened aluminum and stainless steel.

6. The gripper apparatus according to claim 1, wherein the housing is made from a plastic material.

7. The gripper apparatus according to claim 6, wherein the housing is made from a material selected from the group consisting of polyamide, acetal resins, semi-crystalline thermoplastic polyesters, and polyethyleneterephthalate and combinations thereof.

8. The gripper apparatus according to claim 1, wherein the actuator has an axis of rotation tangent to a line of travel associated with the reciprocating linear movement of the pair of jaws.

9. The gripper apparatus according to claim 1, further comprising an end plate attached to the yoke by fasteners that secure the pair of jaws, the jaw coupler, the threaded driver, the drive shaft, and the actuator to the housing.

10. The gripper apparatus according to claim 1, wherein the actuator is an electric motor.

11. The gripper apparatus according to claim 1, wherein the pair of jaws include through-bores through which a plurality of mechanical fasteners are received for securing jaw tips to the pair of jaws.

12. The gripper apparatus according to claim 1, further comprising an encoder that is configured to monitor and control direction of rotation, and speed of rotation of the driver.

13. A gripper apparatus comprising:
    an actuator;
    a drive nut having a bore disposed therethrough wherein the bore has threads on its inner surface;
    a pair of resilient thrust bearings each attached to opposite ends of the drive nut;
    a drive assembly comprising a threaded driver and a pin attached to the threaded driver, the threaded driver having threads corresponding to the threads in the drive nut attached to the actuator that rotatably engages the drive nut causing the driver to move in a linearly reciprocating motion;

a pair of jaws, each having a stepped structure defined between a narrow-width portion and a thicker portion, the stepped structures being aligned to abut each other, the narrow-width portion of each of said jaws also having a through-slot disposed therethrough wherein the pin engages each of said jaws and moves along each through slot such that the pair of said jaws move between an open and closed position as the pin moves in a reciprocal manner by the actuator and along an axis of rotation of the actuator; and a housing mounted to the actuator and having a central bore disposed therethrough containing the driver, the drive nut, and the pair of resilient thrust bearings, and having a yoke on one end thereof which includes receiving slots on opposite surfaces of the yoke wherein the pair of jaws are contained in the yoke such that the receiving slots receive the pin extended through each through slot.

14. The gripper apparatus according to claim 13, wherein the actuator is an electric motor.

15. The gripper apparatus according to claim 13, also comprising covers attached to the receiving slots on the housing to protect the driver.

16. The gripper apparatus according to claim 13, wherein the threaded driver is made from stainless steel.

17. The gripper apparatus according to claim 13 wherein the bore of the drive nut having an inner surface made from a low friction plastic compound.

18. The gripper apparatus according to claim 13, further comprising a motor mounting plate having a motor bore disposed therethrough and attached to the housing such that the actuator attaches to the plate with the driver disposed through the motor bore attaching to the actuator.

19. The gripper apparatus according to claim 13, further comprising an end plate attached to the yoke by fasteners that secures the pair of jaws and the drive assembly, to the housing.

20. The gripper apparatus according to claim 13, also comprising an encoder that can be configured to monitor and control direction of rotation, and speed of rotation of the drive assembly.

* * * * *